Dec. 31, 1968     H. O. NELSON     3,418,960
VEHICLE WHEELS
Filed Feb. 13, 1967     Sheet 1 of 3
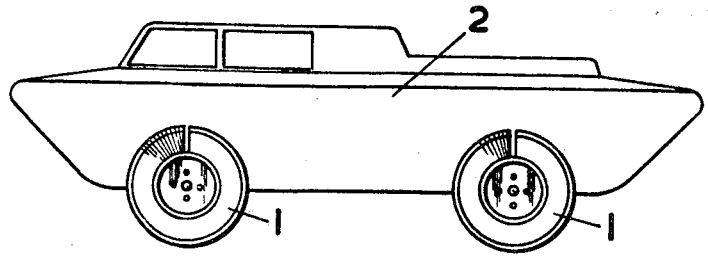
FIG. 1.
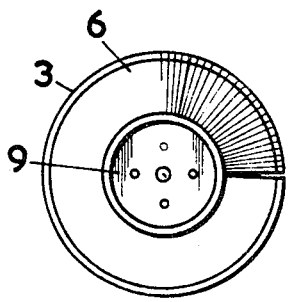 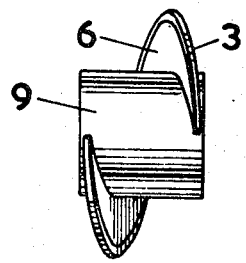
FIG. 2.        FIG. 2a.
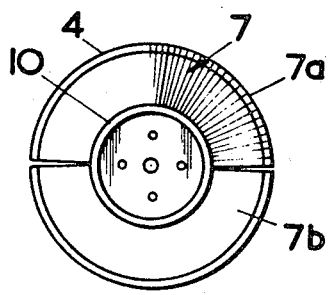 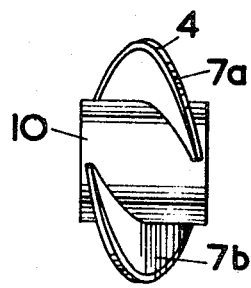
FIG. 3.        FIG. 3a.
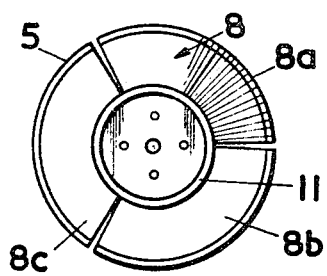 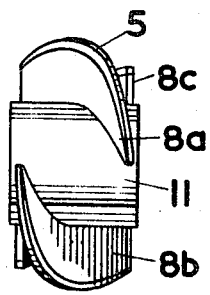
FIG. 4.        FIG. 4a.
Inventor
Herbert Oliver Nelson
By
Cushman, Darby & Cushman
Attorneys Dec. 31, 1968

H. O. NELSON 3,418,960

VEHICLE WHEELS

Filed Feb. 13, 1967

Inventor
Herbert Oliver Nelson
By
Cushman, Darby & Cushman
Attorneys

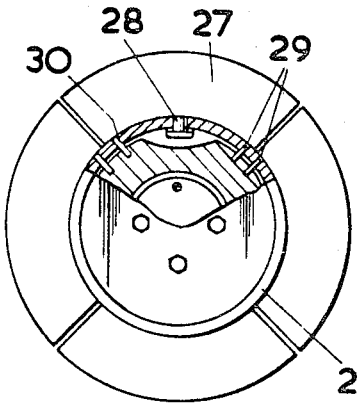
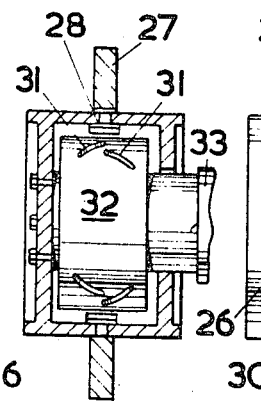
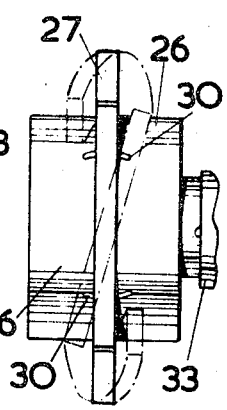
FIG. 8.  FIG. 8b.  FIG. 8a.
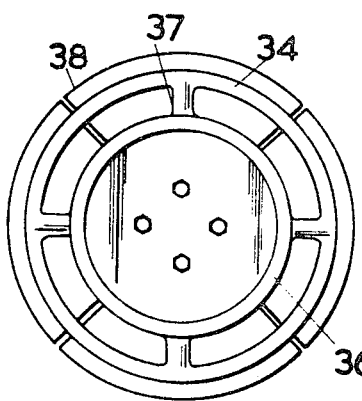
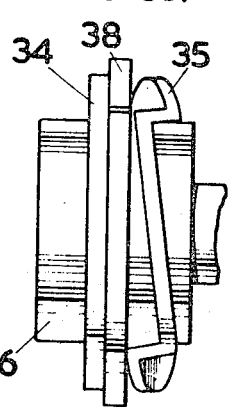
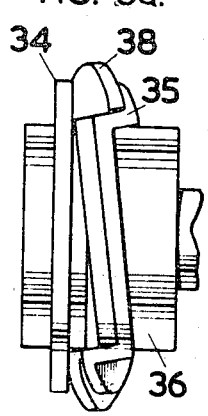
FIG. 9.  FIG. 9a.  FIG. 9b.
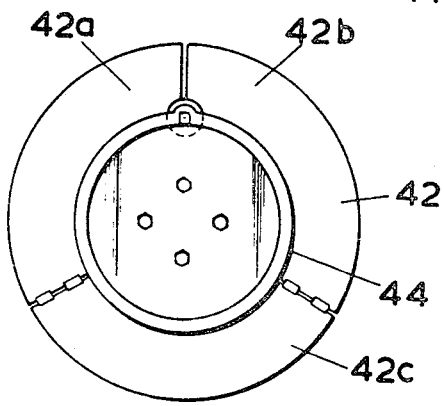
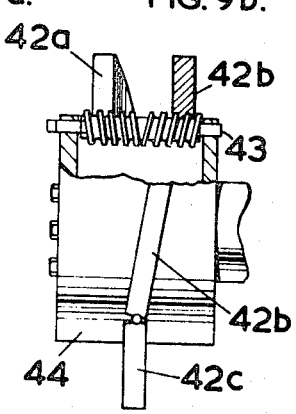
FIG. 10.  FIG. 10a.

United States Patent Office 3,418,960
Patented Dec. 31, 1968

3,418,960
VEHICLE WHEELS
Herbert Oliver Nelson, Lymington, England, assignor to the Secretary of State for Defence in Her Britannic Majesty's Government of the United Kingdom of Great Britain and Northern Ireland, London, England
Filed Feb. 13, 1967, Ser. No. 615,715
6 Claims. (Cl. 115—1)

ABSTRACT OF THE DISCLOSURE

This invention relates to vehicle wheels which are particularly adapted for amphibious vehicles when traversing ground such as water saturated soil, sand or shingle, in which normal wheels tend to spin and sink and for the propulsion of such vehicles when swimming. The object of the present invention is so to form the wheels of a vehicle that their propulsive effort will increase as they sink into the ground whilst at the same time they will also tend to resist such sinking.

---

According to this invention the wheels, or some of the wheels of a vehicle each includes a hub, a rim and a web between the hub and the rim which web may be substantially inclined relative to the longitudinal axis of the vehicle or is in the form of a helix, or is so constructed that it can be brought to such inclination or form as and when required. The hub of such a wheel may be of considerable diameter so that in addition to housing any mechanism required for controlling the setting of the web of the wheel it can provide buoyancy by displacement and also serve as an additional load bearing surface of a vehicle if the wheels thereof sink sufficiently into the ground to cause the hub to contact it.

The invention will now be described, by way of example only, in the accompanying drawings in which:

FIGURE 1 is a side view of a vehicle equipped with wheels according to this invention;

FIGURES 2, 3, 4 are front views of different forms of wheels and FIGURES 2a, 3a, 4a are their respective side views;

FIGURE 6 is a front view of another form of wheel also shown in side view at FIGURE 6a;

FIGURE 8 is a partly sectioned front view of another form of wheel, FIGURE 8a is a side view thereof and FIGURE 8b is a further side view shown in section;

FIGURE 9 is a front view of another form of wheel also shown in side view in FIGURE 9a with its web flat for normal road use and in FIGURE 9b with its web in position for use in soft soil;

FIGURE 10 is a front view of another form of wheel and FIGURE 10a is a partly sectioned side view thereof.

Figure 5:
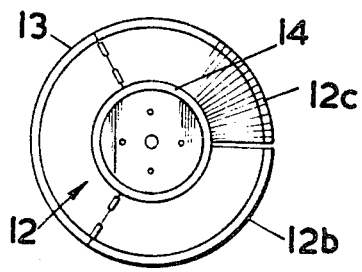
FIGURE 5 is a front view of another form of wheel.

In FIGURE 1, wheels 1 according to this invention are fitted to any suitable vehicle such as the one indicated at 2. Such wheels 1 may replace all conventional wheels if the vehicle 2 is equipped with a four wheel drive system and/or the vehicle is amphibious. Alternatively, if the vehicle 2 is equipped with a two wheel drive system then the drive wheels only may be equipped the wheels 1 and conventional wheels used for the non-driving wheels.

In the simple forms of wheels shown in FIGURES 2, 2a, 3, 3a, 4, 4a there is respectively provided a rigid rim 3, 4, 5 and a rigid web 6, 7, 8 connecting the rim to a hub 9, 10, 11. The web 6 in FIGURE 2 is formed as a single helix or as in FIGURES 3 and 4, the web 7, 8 is formed as a plurality of segments 7a, 7b, 8a, 8c inclined or of curved form, each segment presenting a leading edge to facilitate entry of the segment into the ground.

The web of a wheel may, however, in normal use lie in a plane normal to the axis of the wheel and be divided radially into a plurality of segments, some or all of which can be moved about pivots or be stressed in any convenient manner so that they are inclined to their normal plane or are caused to assume substantially a helical form.

Figure 5A:
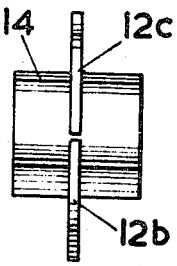
FIGURE 5a is a side view of such a wheel when in its condition for use on normal hard road surfaces.
Figure 5B:
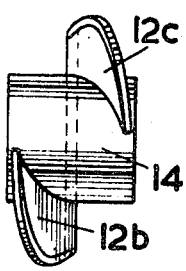
FIGURE 5b is another side view showing the wheel in its operative condition for use on soft ground.

FIGURES 5, 5a, 5b show one such arrangement of wheel in which the web 12 and if required the rim 13 is divided radially into three similar segments 12a, 12b, 12c, which are pivotally connected one to another along their adjacent edges. The segment 12a which is rigidly connected to the wheel hub 14 subtends an angle of 120° and has pivotally connected to one of its radial edges the segment 12b of 120°. Its other radial edge also has pivotally mounted thereon the segment 12c extending about an angle of 120°. The two pivotally mounted segments 12b, 12c can be moved about their pivots in any suitable manner so that they can be inclined as seen in FIGURE 5b, e.g. at an angle of 20° or more to their normal plane; an edge of one of said segments presenting a free leading edge to facilitate entry of the web into the ground. To facilitate normal travel on roadways the rim or each segmental portion of the rim may be provided with a pneumatic or other tire.

Figure 6:
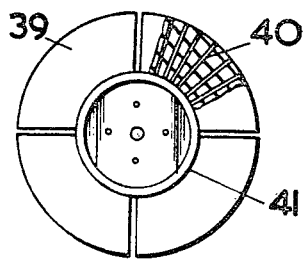
Figure 6A:
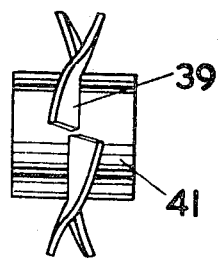

The web 39 of a wheel shown in FIGURES 6, 6a may be formed of a material other than metal. For example the web 39 can consist of vucanised India-rubber or a synthetic plastic material having embedded therein radial spokes 40. Such a web 39 can be readily stressed to form a helix or a series of sections of helical form about the hub 41 of the wheel.

Figure 7:
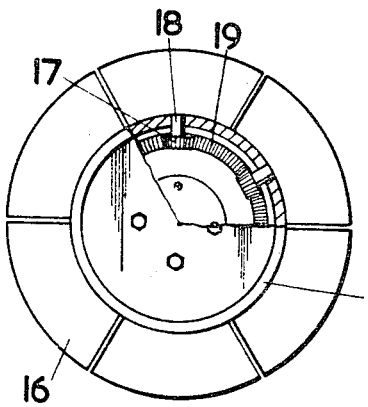
FIGURES 7 and 7a are partly sectioned front and side views respectively of another form of wheel.
Figure 7A:
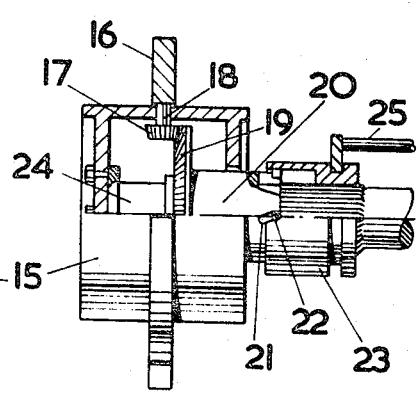

In the wheel shown in FIGURES 7, 7a the segments are not pivotally connected one to another as in FIGURE 5 but each segment is to be individually movable and can be so adjusted that it presents a free leading edge. In some cases the segments may be movable about a median radial line and be pivotally supported in the hub and a rigid rim.

Means for moving the segments from their normal position into an inclined or helical condition and for returning them to their normal position may consist of a mechanically, hydraulically or electrically operated driving means which is additional to the normal means for transmitting motion to the wheels. Such driving means will control a segment actuating mechanism housed in the hub of the wheel.

In an actuating mechanism shown in FIGURES 7, 7a a wheel hub 15 carries segments 16 and pinions 17 keyed to extensions 18 of the segments 16 which extend into the hub 15. These pinions 17 engage and are rotated by a toothed gear wheel 19 provided with a cylindrical extension 20 having inclined slots 21 which are engaged by pin 22 carried on a sliding sleeve 23 rotatable with an axle 24. Movement of this sliding sleeve 23 by an operating fork 25 causes the pins 22 to move along the inclined slots 21 thereby rotating the gear wheel 19.

Alternatively as shown in FIGURES 8, 8a, 8b, on a wheel hub 26 the ends of segments 27 remote from their pivots 28 are provided with inwardly directed extensions 29 which extend through slots 30 in the hub 26. Such extensions 29 have bearing surfaces formed thereon that engage cam surfaces or slots 31 carried by an annular member 32 housed in and co-axial with the hub 26, said annular member 32 being rotatable relative to the hub 26 by a sliding sleeve 33 to move the segments 27 from the position shown in solid lines, to the position shown in broken lines and vice versa.

Another segmental actuating means is shown in FIGURES 9, 9a, 9b, and comprises two rings 34, 35 co-axial with a hub 36 and supported on spiders 37 slidable on the said hub 36. The rings 34, 35 are disposed on opposite sides of a web 38 of the wheel each with an edge thereof in contact with the web 38. The ring 34 has a contacting edge which is flat or plane whilst the other ring 35 has a contacting edge of undulating form. When the wheel is in its normal condition for traversing hard terrain, FIGURE 9a, the plane edge of the ring 34 will completely engage the web 38 and serve as a reinforcement therefor whilst the undulating edge of the ring 35 will have point contacts with the web 38. When the wheel is required to operate in softer ground, FIGURE 9b, the rings 34, 35 are simultaneously moved along the hub 36 to bring the undulated surface of the ring 35 completely into engagement with the web 38 to cause the segments thereof to be moved to their inclined or helical positions whilst the plane edge of the ring 34 maintains point contact with the web 38.

In the case of the wheel shown in FIGURES 10, 10a, in which a web 42 consists of two segments 42a, 42b pivotally mounted upon the radial edges of a fixed segment 42c, the adjacent free radial edges of the pivotally mounted segments 42a, 42b may be actuated by a rotatable shaft 43 carried by the hub and disposed parallel to the axis of the wheel. Such rotatable shaft 43 has formed thereon a right-hand screw-threaded portion and a left-hand screw threaded portion which are respectively engaged by the pivotally mounted segments 42a, 42b. Rotation of the shaft 43 causes the adjacent free radial edges of the pivotally mounted segments 42a, 42b, to be moved towards or away from one another as required. The screw-threaded portions of the shaft 43 may partially extend through slots in the hub 44 to engage those edges of the pivotally mounted segments 42a, 42b adjacent the hub 44 or lugs on the said segments 42a, 42b may extend through slots to engage the shaft 43 when it is entirely housed in the hub 44.

If required the wheel axle may be carried in a pneumatic mounting which will house the central portion of the cylindrical hub which will contain the mechanism for controlling the positions of the wheel web segments. The buoyancy of the hub may also be increased by the provision of pneumatic tires or containers carried thereby.

What I claim is:

1. A vehicle wheel comprising:
   a hub having a large surface area;
   a ground contacting rim spaced radially from the hub;
   a plurality of segments constituting a web between the hub and the rim; and
   means for retainably adjusting at least one of said segments to any required plane between the plane normal to the wheel axis and a plane inclined at a limiting angle to that normal plane.

2. A vehicle wheel according to claim 1 further including:
   rim segments fixed to the outer edges of the web segments;
   pivots carried radially in the hub and upon which said web segments are mounted; and
   an actuating mechanism for rotating the segments about their pivots.

3. A vehicle wheel according to claim 2 wherein the actuating mechanism includes:
   pinions within the hub secured to and co-axial with the pivots;
   a gearwheel located within and coaxial with the hub and engaging the pinions;
   a tubular axial extension of the gearwheel surrounding and rotatable relative to the wheel axle and provided with inclined slots;
   a sleeve slidable along the wheel axle; and
   pins carried by said sleeve which engage said inclined slots to rotate the gearwheel extension and hence the web segments.

4. A vehicle wheel according to claim 2 wherein the actuating mechanism includes:
   projections on the segments extending inwardly through slots in the hub;
   an annular member housed in the hub and rotatable relative thereto;
   cam surfaces carried by said annular member and engaging said projections; and
   a sleeve slidable along the wheel axle, movement of which sleeve causes said annular member to rotate relative to the hub and thus rotates the web segments.

5. A vehicle wheel according to claim 1 including:
   a first segment fixed to the hub in a plane normal to the wheel axis;
   second and third segments hinged one upon each end of said first segment; and
   means for retainably adjusting said second and third segments to lie in any required plane between the normal to the wheel axis and a plane inclined at a limiting angle to that normal.

6. A vehicle wheel according to claim 5 wherein the adjusting means comprises:
   a rotatable shaft having a right hand screw-threaded portion and a left hand screw-threaded portion, the screw-threaded portions being respectively engaged by the free radial edges of said second and third segments whereby rotation of said shaft will move said second and third segments into their required position.

References Cited

UNITED STATES PATENTS

| 527,991 | 10/1894 | Jacobs | 170—153 |
| 847,961 | 3/1907 | Delamar | 180—3 XR |
| 2,953,208 | 9/1960 | O'Connor | 170—160.24 |
| 3,082,827 | 3/1963 | Rosen | 115—34 XR |
| 3,250,239 | 5/1966 | Garate | 115—1 |

ANDREW H. FARRELL, *Primary Examiner.*

U.S. Cl. X.R.

180—3; 301—41